United States Patent
Whitaker et al.

(10) Patent No.: US 12,428,898 B2
(45) Date of Patent: *Sep. 30, 2025

(54) MOTORIZED DOOR ASSEMBLY WITH SAFETY FEATURES FOR HEATED CABINET

(71) Applicant: APEX INDUSTRIAL TECHNOLOGIES LLC, Mason, OH (US)

(72) Inventors: Craig Whitaker, Fairfield, OH (US); Edward Leonard Weaver, II, Milford, OH (US); Scott A. Zieker, Cincinnati, OH (US); Charles Eldon Warner, Cincinnati, OH (US); Ronald G. Knollman, Mt. Healthy, OH (US)

(73) Assignee: APEX INDUSTRIAL TECHNOLOGIES LLC, Mason, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/416,407

(22) Filed: Jan. 18, 2024

(65) Prior Publication Data
US 2024/0151093 A1    May 9, 2024

Related U.S. Application Data

(63) Continuation of application No. 15/980,063, filed on May 15, 2018, now Pat. No. 11,913,273.

(Continued)

(51) Int. Cl.
*E05F 15/20* (2006.01)
*E05F 15/40* (2015.01)
(Continued)

(52) U.S. Cl.
CPC .............. *E05F 15/73* (2015.01); *E05F 15/40* (2015.01); *E05F 15/41* (2015.01); *E05F 15/43* (2015.01);
(Continued)

(58) Field of Classification Search
CPC . E05F 15/00; E05F 15/73; E05F 15/40; E05F 15/41; E05F 15/614; E05F 15/53;
(Continued)

(56) References Cited

U.S. PATENT DOCUMENTS

| | | |
|---|---|---|
| 3,785,089 A | 1/1974 | Smith |
| 3,974,117 A | 8/1976 | Illmann et al. |

(Continued)

FOREIGN PATENT DOCUMENTS

| | | |
|---|---|---|
| DE | 9319914 U1 | 3/1994 |
| DE | 29811584 | 11/1999 |

(Continued)

OTHER PUBLICATIONS

Canadian Patent Office, Canadian Examination Report dated Jul. 18, 2023, which pertains to Canadian Divisional Patent Application No. 3,145,014, filed Jan. 7, 2022. 4 pgs.

(Continued)

*Primary Examiner* — Chi Q Nguyen
(74) *Attorney, Agent, or Firm* — Thompson Hine LLP

(57) ABSTRACT

A heated cabinet including door assembly having a door positioned between opposing jambs of a door frame, wherein the door is pivotable, about a pivot axis, between an open position and a closed position. The door assembly includes a motor assembly operably connected to the door to pivot the door about the pivot axis and a control board operatively coupled to the motor assembly. The door assembly further has a first break beam emitter mounted to one of the opposing jambs and a first break beam receiver mounted to another of the opposing jambs and operatively connected to the control board. The first break beam emitter and first break beam receiver are disposed along a beam axis extending parallel to the pivot axis and proximate to an edge of the door adjacent to the pivot axis. The door assembly is (Continued)

configured such that interruption of a beam projected between the first break beam emitter and the first break beam receiver alters operation of the motor assembly.

20 Claims, 8 Drawing Sheets

Related U.S. Application Data

(60) Provisional application No. 62/506,493, filed on May 15, 2017.

(51) Int. Cl.

| | | |
|---|---|---|
| *E05F 15/41* | (2015.01) | |
| *E05F 15/43* | (2015.01) | |
| *E05F 15/611* | (2015.01) | |
| *E05F 15/614* | (2015.01) | |
| *E05F 15/73* | (2015.01) | |
| *F16D 7/02* | (2006.01) | |
| *F16D 7/04* | (2006.01) | |

(52) U.S. Cl.
CPC .......... *E05F 15/611* (2015.01); *E05F 15/614* (2015.01); *F16D 7/025* (2013.01); *F16D 7/044* (2013.01); *E05F 2015/435* (2015.01); *E05F 2015/765* (2015.01); *E05Y 2201/216* (2013.01); *E05Y 2600/41* (2013.01); *E05Y 2900/308* (2013.01)

(58) Field of Classification Search
CPC ... E05F 15/611; E05F 15/43; E05F 2015/435; E05F 2015/765; E05Y 2201/216; E05Y 2600/41; E05Y 2600/13; E05Y 2900/308; F16D 7/044; F16D 7/046; F16D 7/048; F16D 7/025; A47F 2003/008; Y10T 74/18784
See application file for complete search history.

(56) References Cited

U.S. PATENT DOCUMENTS

| | | | |
|---|---|---|---|
| 4,289,995 A | 9/1981 | Sorber et al. | |
| 4,922,168 A | 5/1990 | Waggamon et al. | |
| 5,221,239 A | 6/1993 | Catlett | |
| 5,243,735 A | 9/1993 | O'Brien, II | |
| 5,524,738 A | 6/1996 | Erlebach et al. | |
| 5,878,530 A | 3/1999 | Eccelston et al. | |
| 6,002,217 A | 12/1999 | Stevens et al. | |
| 6,575,277 B1 | 6/2003 | Torii et al. | |
| 6,734,648 B2 | 5/2004 | Fukumura et al. | |
| 7,310,911 B1 | 12/2007 | Sellman | |
| 7,791,204 B2 | 9/2010 | Hayashi et al. | |
| 8,181,763 B2 | 5/2012 | Gresley et al. | |
| 8,225,458 B1 | 7/2012 | Hoffberg | |
| 9,725,942 B2* | 8/2017 | Gunreben ............... | E05F 15/40 |
| 11,913,273 B2* | 2/2024 | Whitaker ............... | E05F 15/43 |
| 12,123,247 B2* | 10/2024 | Vonaesch ............. | H05B 47/115 |
| 2002/0026750 A1 | 3/2002 | St. John et al. | |
| 2008/0088462 A1* | 4/2008 | Breed .................... | B60Q 1/143 |
| | | | 340/573.1 |
| 2011/0252597 A1 | 10/2011 | Burris et al. | |
| 2013/0098184 A1 | 4/2013 | Cianetti | |
| 2013/0133447 A1 | 5/2013 | Leivenzon et al. | |
| 2015/0075074 A1* | 3/2015 | Lofberg ................. | E05F 15/75 |
| | | | 49/32 |
| 2017/0247930 A1* | 8/2017 | Heidrich ............... | E05F 15/603 |
| 2018/0328099 A1* | 11/2018 | Whitaker ............... | E05F 15/41 |
| 2021/0026036 A1* | 1/2021 | Thun-Hohenstein ... | G01S 17/32 |
| 2023/0146031 A1* | 5/2023 | Kobel ..................... | E05F 15/73 |
| | | | 49/13 |
| 2023/0203876 A1* | 6/2023 | Gregoriou .............. | E05F 15/74 |
| | | | 160/7 |
| 2024/0328235 A1* | 10/2024 | Gregoriou .............. | E05F 15/74 |

FOREIGN PATENT DOCUMENTS

| | | |
|---|---|---|
| DE | 102006029902 A1 | 1/2008 |
| DE | 102010019357 | 11/2011 |
| EP | 0436486 | 7/1991 |
| EP | 1 321 619 A2 | 6/2003 |
| EP | 1 767 865 A2 | 3/2007 |
| EP | 2009210 A2 | 12/2008 |
| EP | 2 017 423 | 1/2009 |
| EP | 2009210 A3 | 2/2012 |
| GB | 2365063 | 12/2002 |
| WO | 0156142 A1 | 8/2001 |

OTHER PUBLICATIONS

Australian IP Office, Australian Examination Report dated May 10, 2023, which pertains to Australian Divisional Patent Application No. 2022200767, filed May 15, 2019. 4 pgs.
Canadian Patent Office, Canadian Examination Report dated Feb. 16, 2023, which pertains to Canadian Divisional Patent Application No. 3,145,014, filed Jan. 7, 2022. 5 pgs.
European Patent Office, Communication pursuant to Rules 70(2) and 70a(2) EPC and Extended Search Report issued Jun. 22, 2021, which pertains to European Patent Application No. 18802954.0. 12 pgs.
Australian IP Office, Australian Examination Report No. 2 dated Jun. 3, 2021, which pertains to Australian Patent Application No. 2018270923. 4 pgs.
European Patent Office, Communication pursuant to Rule 164(1) EPC, Supplemental European Search Report issued Feb. 26, 2021, which pertains to European Patent Application No. 18802954.0. 12 pgs.
Canadian Patent Office, Canadian Examination Report dated Feb. 23, 2021, which pertains to Canadian Patent Application No. 3,062,864. 4 pgs.
Australian IP Office, Australian Examination Report No. 1 issued Dec. 16, 2020, which pertains to Australian Patent Application No. 2018270923. 5 pgs.
PCT, U.S. Patent and Trademark Office (ISA/US), International Search Report and Written Opinion, issued Oct. 16, 2018, which pertains to PCT Application No. PCT/US2018/032698. 11 pgs.
European Patent Office, Extended European Search Report issued Aug. 28, 2023, which pertains to European Patent Application No. 23178834.0. 8 pgs.
European Patent Office, Communication pursuant to Article 94(3) EPC, European Patent Application No. 23178834.0, 6 pages, Jun. 18, 2025.

* cited by examiner

MOTORIZED DOOR ASSEMBLY WITH SAFETY FEATURES FOR HEATED CABINET

This application is a continuation of U.S. application Ser. No. 15/980,063, filed on May 15, 2018 and entitled Motorized Door Assembly with Safety Features for Heated Cabinet, which in turn claims priority to U.S. Provisional Application Ser. No. 62/506,493 filed on May 15, 2017 and entitled Motorized Door Assembly with Safety Features for Heated Cabinet. The entire contents of both of those applications are hereby incorporated herein by reference.

The present application is directed to cabinets and enclosures for the dispensing of items and, more particularly, to a motorized door assembly for installation in heated cabinets and enclosures that includes heat-tolerant safety features to prevent pinching injury.

BACKGROUND

Cabinets and enclosures including internal compartments for holding items such as foodstuffs have been used in concepts such as the "automat." Automats may include multi-tiered, locker-like cabinets and use a central controller to control the operation of individual access doors based upon a payment or other authorization, unlocking a particular access door and allowing a customer manual access to a foodstuff stored within a particular compartment.

When dispensing foodstuffs, the customer is generally required to open an access door and to reach within an enclosed space in order to retrieve their purchase. The customer then, usually, closes the door and leaves with their purchase. If an access door is not closed, there is often little consequence. However, when dispensing heated foodstuffs, such as a pizza that would be held at temperatures of about 140° F. to about 165° F. (60 C to 74 C), the open access door permits substantial heat to escape into the customer pick-up area, compromising environmental control, increasing energy consumption, and potentially creating a safety hazard. On the other hand, automatically closing an access door risks inflicting a "pinching injury" upon a customer who may still be reaching within the enclosed space due to inattention, inadvertent delay, or difficulty in removing their purchase.

SUMMARY

This application discloses a motorized door assembly for use with heated cabinets. In a first aspect, the door assembly includes a slip clutch serving to control the closing force of a door. The slip clutch includes a spring-loaded, profiled clutch plate face engaging a counter-profiled drive plate face to limit the maximum torque transmissible to a driven shaft from an electric motor of the assembly. In a second aspect, the door assembly includes a break beam emitter and break beam receiver for installation on a door-opening side of door frame jambs proximate to, but not adjoining, the door's opened and/or closed position, where interruption of the break beam disables or reverses operation of the electric motor of the assembly. The break beam devices each include a light pipe adjoining the beam-emitting and beam-receiving electronics, respectively, to space the electronics apart from the door side of the door jamb(s) and protect the electronics from conductive and convective heat transfer from the heated compartment. Either or both aspects may be employed to allow automatic control of a door to a heated compartment while reducing the potential for pinching injury by the motorized door assembly.

In a first aspect, disclosed is a motorized door assembly including a door positioned between opposing jambs of a door frame and movable between an open position and a closed position, where the door pivots about a pivot axis extending across the opposing jambs. The door assembly also includes a motor assembly mounted adjacent to the door, and having an electric motor, a plurality of drive gears, a slip clutch, and a driven shaft operably connected to the door to pivot the door about the pivot axis. The slip clutch includes a clutch plate that is slideable along the driven shaft, a drive plate driven by the electric motor via the drive gears, and a clutch spring urging the clutch plate into engagement with the drive plate, with the clutch plate having a profiled face and the drive plate having a counter-profiled face for engagement with the profiled face.

In a second aspect, disclosed is a motorized door assembly including a door positioned between opposing jambs of a door frame and movable between an open position and a closed position, where the door pivots about a pivot axis extending across the opposing jambs. The door assembly also includes a motor assembly operably connected to the door to pivot the door about the pivot axis, a control board controlling the motor assembly, a first break beam emitter mounted to one of the opposing jambs and operatively connected to the control board, and a first break beam receiver mounted to another of the opposing jambs and operatively connected to the control board. The first break beam emitter and first break beam receiver are disposed along a beam axis extending parallel to the pivot axis and proximate to an edge of the door opposite the pivot axis. Interruption of a light beam projected along the beam axis between the first break beam emitter and the first break beam receiver alters a signal of the operative connections to the control board, whereupon the control board alters operation of the motor assembly.

In one embodiment the disclosure is directed to a heated cabinet including door assembly having a door positioned between opposing jambs of a door frame, wherein the door is pivotable, about a pivot axis, between an open position and a closed position. The door assembly includes a motor assembly operably connected to the door to pivot the door about the pivot axis and a control board operatively coupled to the motor assembly. The door assembly further has a first break beam emitter mounted to one of the opposing jambs and a first break beam receiver mounted to another of the opposing jambs and operatively connected to the control board. The first break beam emitter and first break beam receiver are disposed along a beam axis extending parallel to the pivot axis and proximate to an edge of the door adjacent to the pivot axis. The door assembly is configured such that interruption of a beam projected between the first break beam emitter and the first break beam receiver alters operation of the motor assembly.

DETAILED DESCRIPTION

Figure 1A:
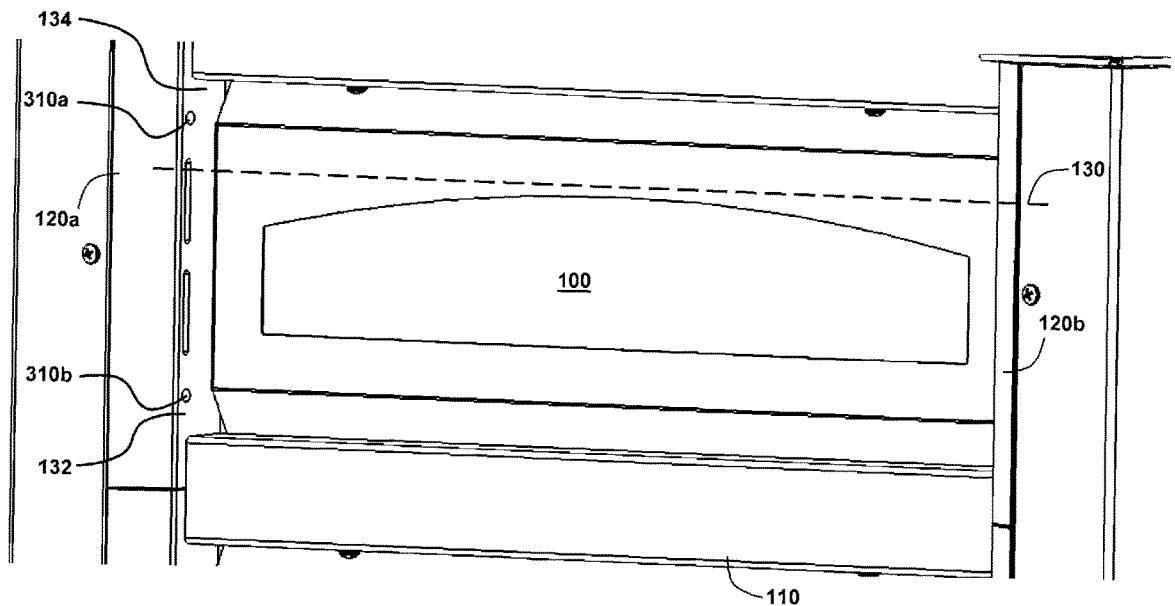
FIGS. 1A and 1B are front views of a heated cabinet including a motorized door assembly, with each view offset to one side to show the jamb of the other side of the door frame.
Figure 1B:
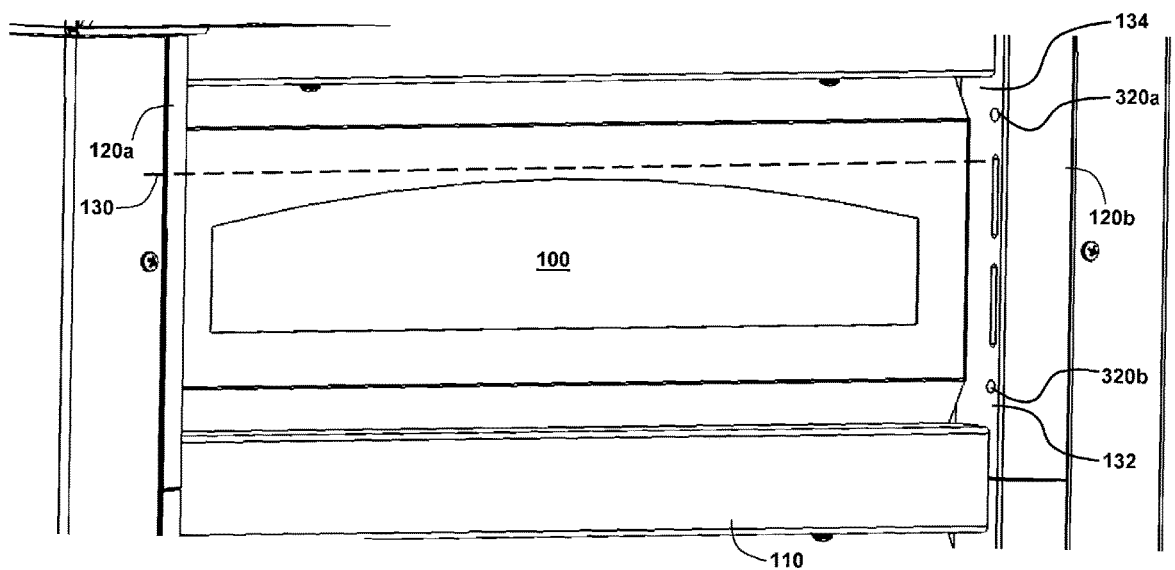

As shown in FIGS. 1A and 1B, the devices disclosed herein are elements of a motorized door assembly including a door 100 that is movable between an open position and a closed position within a door frame 110. The door 100 is positioned between opposing jambs 120a and 120b of the door frame 110, which may be elements of a door assembly module or elements of a cabinet in which the door 100 and other elements of the motorized door assembly are installed. The door 100 may be positioned between a head and a sill (including, for the purposes of this application, any fixed rails or other structures separating doors within a vertical stack of doors), between a head and a lower door, between an upper door and a sill, or between upper and lower doors in a vertical stack of doors, depending upon the arrangement and number of compartments provided in a particular cabinet. The door 100 pivots about an axis 130, such as the illustrated axis adjacent to the top of the door 100 or, alternately, an axis adjacent to the bottom of the door 100. Consequently, the door 100 creates at least two potential pinch points 132 and 134. A first pinch point 132 is created along the edge of the door opposite the pivot axis 130 where closure of the door may potentially capture an extremity such as a finger, hand, or forearm of a customer reaching within the enclosed space of a compartment. A second pinch point 134 is created near the edge of the door adjacent to the pivot axis 130 where opening of the door may potentially capture an extremity such as the finger of a customer resting their hand against the door frame between the edge or external face of the door and an adjacent head, sill, or other door.

Figure 2:
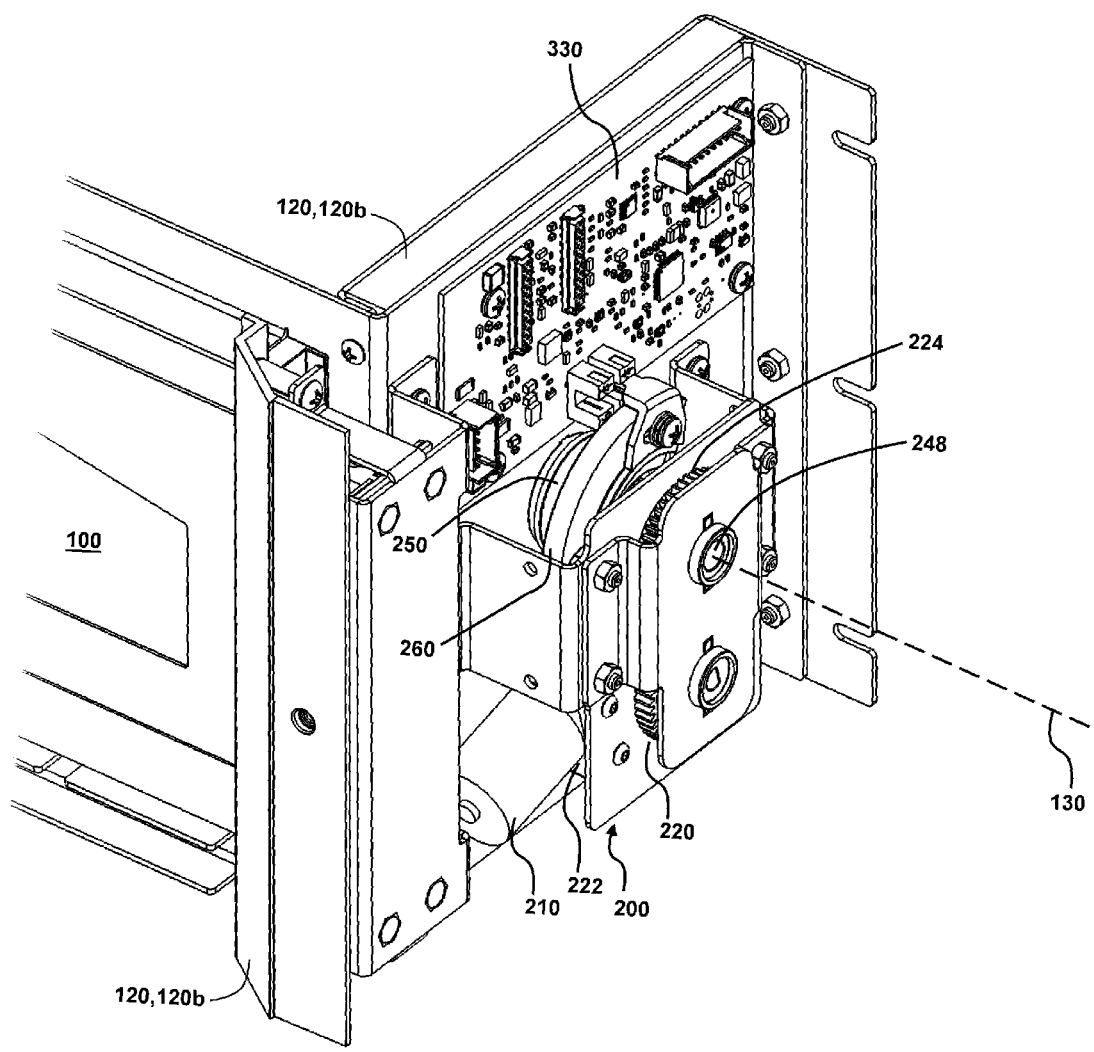
FIG. 2 is a perspective view of a motor assembly mounted between the right side jamb of FIGS. 1A and 1B and the exterior of a cabinet (not shown).

In a first aspect, FIG. 2 shows a motor assembly 200 mounted to a jamb 120, specifically the right side jamb 120b of FIGS. 1A and 1B opposite the door 100. It will be appreciated that the aspect is not restricted to this specific, illustrated mounting. The motor assembly 200 includes an electric motor 210, a plurality of drive gears 220, a driven shaft 230, and a slip clutch 240 (the driven shaft 230 and slip clutch 240 being shown in FIGS. 3B and 4-6). The electric motor 210 is preferably oriented perpendicular to the pivot axis 130 of the door 100, allowing the motor assembly 200 to have relatively low profile or width and thus allow for a relatively narrow cabinet side wall, with the plurality of drive gears 220 including a so-called "right angle gearbox" or "90 degree gearbox" 222 (best shown in FIG. 4). In the illustrated construction the driven shaft 230 and pivot axis 130 are coaxial, however it will be appreciated that the driven shaft 230 may connect to a driven gear assembly, multi-point linkage, or other mechanism disposed on the door side of the jamb 120 for pivoting the door 100 about a non-coaxial pivot axis 130.

Figure 3A:
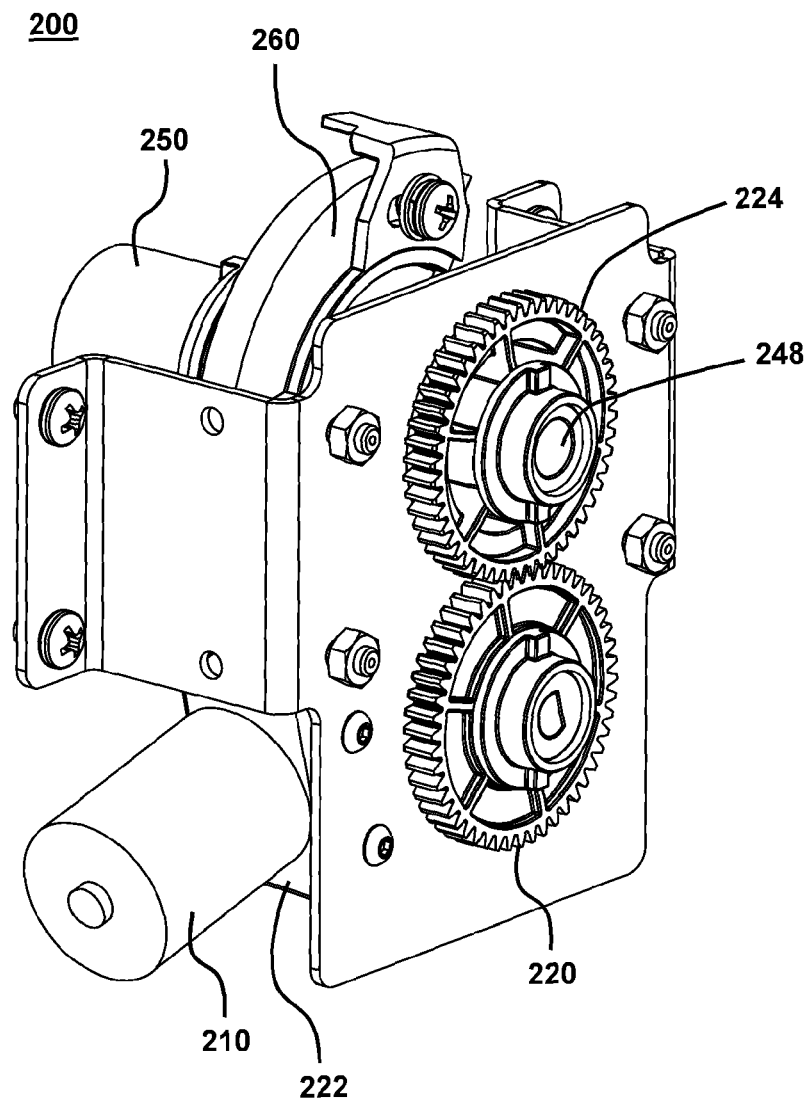
FIGS. 3A and 3B are perspective views of the motor assembly with and without a cooperating bushing retainer, respectively, and without and with a gear assembly retaining plate, respectively.
Figure 3B:
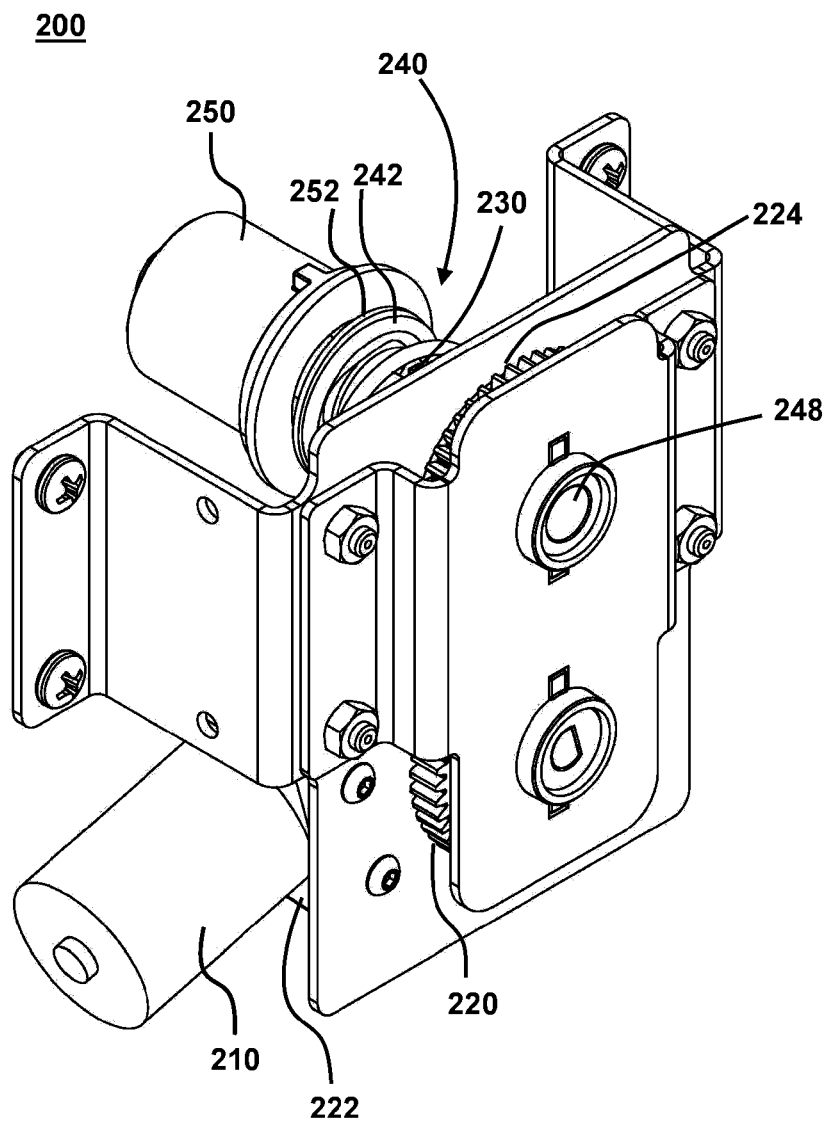

FIG. 3A shows the motor assembly 200 in isolation. The motor assembly 200 may further include a bushing 250 which seats within the jamb 120 and blocks convective heat transfer through the jamb 120 from the heated compartment into the motor assembly. The bushing 250 may be retained within the jamb 120 by a bushing retainer 260 which at least partially encircles the bushing 250. As shown in FIG. 3B, the bushing 250 is otherwise coaxially mounted around the driven shaft 230, and may provide a seat 252 for a clutch spring 242 of the slip clutch 240. In motor assemblies that lack a bushing 250, the driven shaft 230 would extend through a bare aperture in the jamb 120 to the door 100 or to any driven gear assembly, multi-point linkage, or other mechanism for pivoting that is provided. In motor assemblies that lack a bushing 250, the jamb 120 would function as or provide a seat for clutch spring 242.

Figure 4:
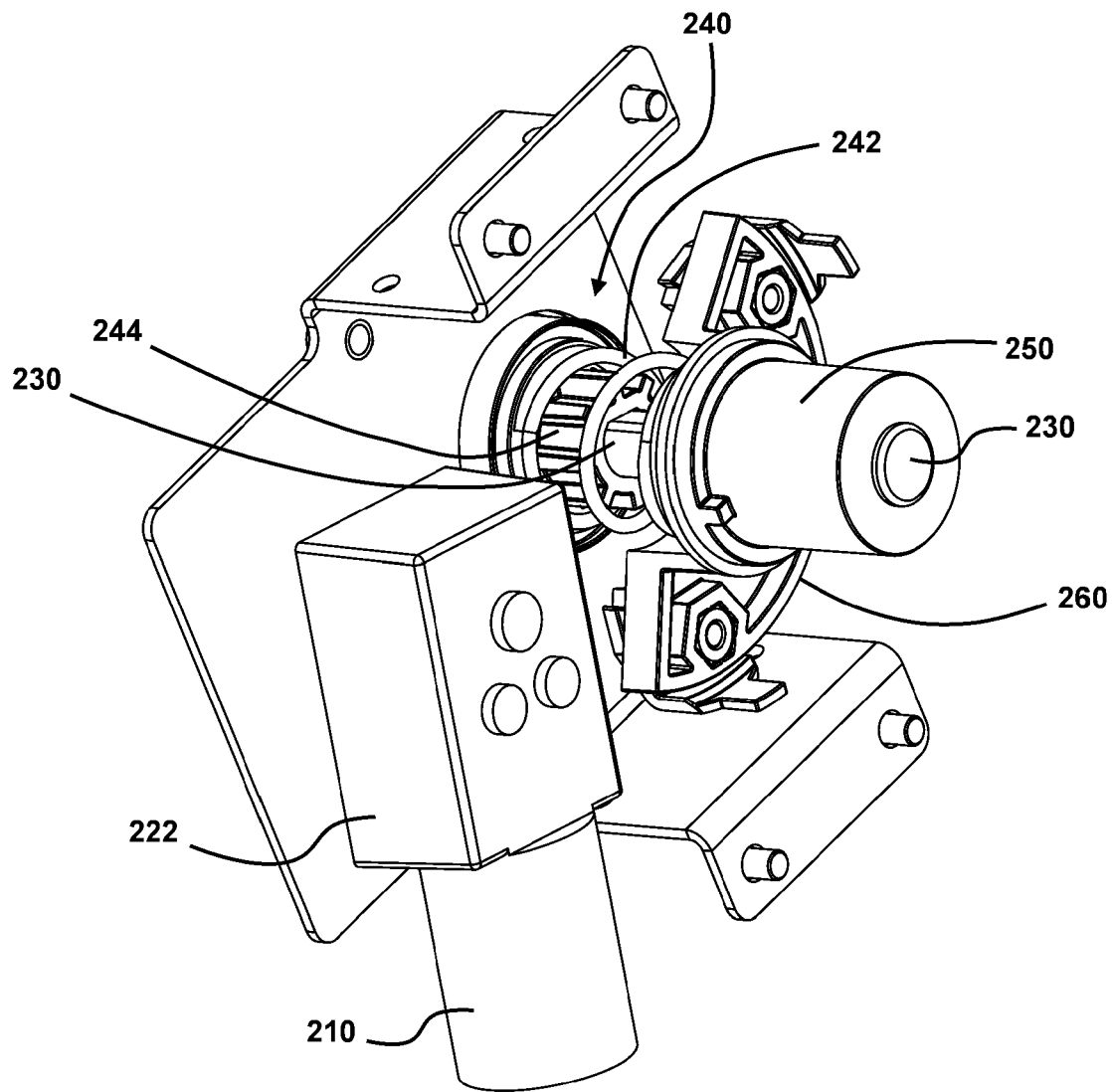
FIG. 4 is a perspective view of the opposite side of the motor assembly shown in FIG. 3A.
Figure 5:
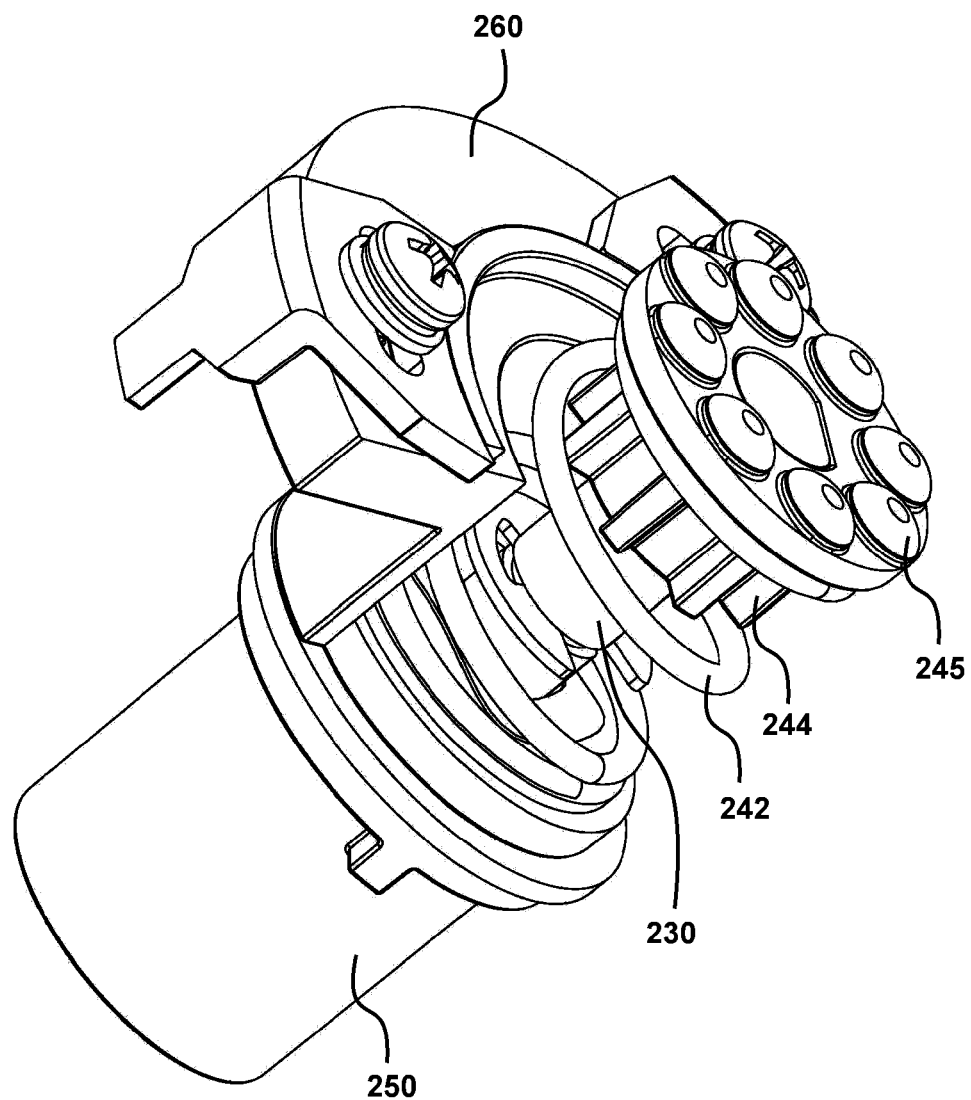
FIG. 5 is a perspective view of the driven portion of the slip clutch element.
Figure 6:
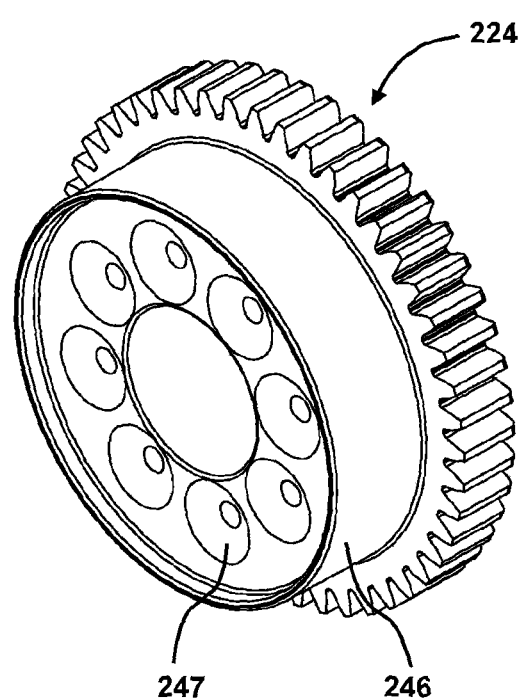
FIG. 6 is a perspective view of a face of a drive portion of the slip clutch element.

FIG. 4 shows the other side of the motor assembly 200 shown in FIGS. 3A and 3B. In addition to the clutch spring 242, the slip clutch 240 includes a clutch plate 244 that is slidable along the driven shaft 230 and has profiled clutch plate face (shown in FIG. 5) and a drive plate 246 (shown in FIG. 6) that has a counter-profiled drive plate face. The drive plate 246 may be a separate part mounted on a drive shaft 248 driven by the plurality of drive gears 220, but may advantageously be integral with a drive gear 224. FIG. 6 shows an example of such a drive gear. One of the clutch and drive plate faces, e.g. the profiled clutch plate face, may include regular pattern of convex rounded projections 245 and the other of the clutch and drive plate faces, e.g., the counter-profiled drive plate face, may include a corresponding pattern of concave rounded dimples 247. The spring force of the clutch spring 242 and profile of the faces of the clutch and drive plates 244, 246 define the maximum torque that may be transmitted through the slip clutch, with torque in excess of the maximum causing the profiled clutch face plate to ride out of the counter-profiled drive plate face and break rotational engagement of the driven shaft 230 with the plurality of drive gears 220 (i.e., drive shaft 248 or drive gear 224). Accordingly, proper definition of the maximum torque by selection of the spring force and profiles of each face can mitigate a risk of pinch injury at pinch point 132 upon closing of door 100. Definition of the maximum torque by selection of the spring force and profiles of each face can also mitigate a risk of pinch injury at pinch point 134 upon opening of door 100, but may require a lower maximum torque since pinch point will be closer to the pivot axis 130 and can likely exert greater force at a particular level of torque.

Figure 7:
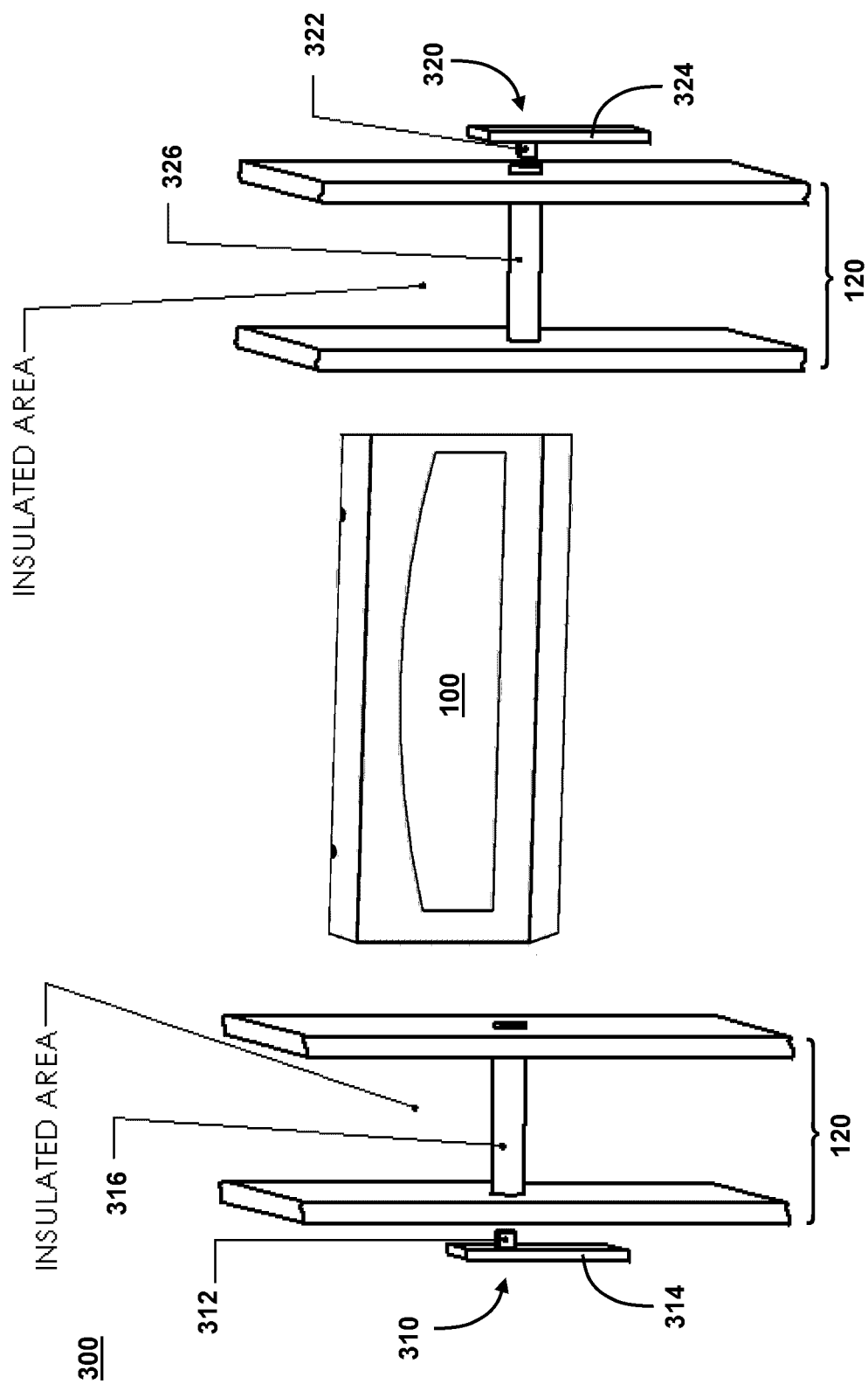
FIG. 7 is a schematic view of a break beam emitter and break beam receiver positioned across a (partial) door frame and upon/with the jambs of the frame.

In a second aspect, FIG. 7 illustrates a break beam device 300 bracketing a door frame and, specifically, mutually opposing jambs 120a and 120b. With reference to FIGS. 1A and 1B, a first break beam device 300 may be positioned at a door-opening side of door frame jambs 120a and 120b proximate to, but not adjoining, the door's closed position. Thus, a break beam emitter 310a and break beam receiver 320a may be disposed along a beam axis parallel to the pivot axis 130 and proximate the edge of door 100 opposite the pivot axis 130. The emitter 310a and receiver 320a are operatively connected to a control board 330 (shown in FIG. 2), and interruption of a light beam projected along the beam axis between the emitter 310a and receiver 320a alters a signal of the operative connection (e.g., interrupts a signal generated by the receiver 320a upon receipt of the emitted beam). The beam axis thus serves to detect intrusion into the first pinch point 132, where closure of the door 100 may potentially capture an extremity such as a finger, hand, or forearm of a customer reaching within the enclosed space of a compartment. Optionally, a second break beam device 300 may be positioned at a door-opening side of door frame jambs 120a and 120b proximate to, but not adjoining, the door's open position. Thus, a break beam emitter 310b and break beam receiver 320b may be disposed along a beam axis parallel to the pivot axis 130 and proximate the edge of door 100 adjacent to the pivot axis 130. The emitter 310b and receiver 320b may be operatively connected to the same control board 330, and interruption of a light beam projected along the beam axis between the emitter 310b and receiver 320b alters a signal of the operative connection (e.g., interrupts a signal generated by the receiver 320b upon receipt of the emitted beam from emitter 310b).

Altering the signal of the operative connection so as to indicate an interruption of the light beam may cause the control board 330 to halt operation of the motor assembly 200. Alternately, altering the signal of the operative connection so as to indicate an interruption of the light beam may cause the control board 330 reverse operation of the motor assembly 200. Any reversal of operation may be dependent upon the operating state of the motor assembly 200. For example, when the motor assembly is closing the door 100, but not opening the door 100, altering the signal of the operative connection for the device 310a/320a may trigger the control board 330 to open the door 100. For further example, when the motor assembly 200 is opening the door 100, but not closing the door 100, altering the signal of the operative connection for the device 310b/320b may trigger the control board 330 to close the door 100.

Returning to FIG. 7, a break beam emitter 310 may comprise an LED 312, supporting electronics 314 (such as an LED driver, diagnostic circuitry, and the like) and a light pipe 316 disposed over the emitting surface of the LED 312. The light pipe 316 may comprise a linear or curvilinear segment of transparent plastic such as polycarbonate, or of a transparent glass such as silica glass. The light pipe 316 may be a segment of fiber optic cabling. As shown in FIG. 7, the emitter 310 is mounted with the light pipe 316 extending through the jamb 120, which is preferably hollow to reduce conductive heat transfer and even more preferably filled with an insulation to reduce convective transfer from the heated compartment. The light pipe 316 and jamb 120 thereby protect the LED 312 and supporting electronics 314 from most conductive and convective heat transfer from the compartment.

A break beam receiver 320 may comprise a photodiode 322, supporting electronics 324 (such as an amplifier, diagnostic circuitry, and the like) and a light pipe 326 disposed over the receiving surface of the photodiode 322. The light pipe 326 may comprise a linear or curvilinear segment of one of the above-described materials, but need not be made from the same material. As shown in FIG. 7, the receiver 320 is mounted with the light pipe 326 extending through the opposing jamb 120, which again is preferably hollow to reduce conductive heat transfer and even more preferably filled with an insulation to reduce convective transfer from the heated compartment. The light pipe 326 and jamb 120 thereby protect the photodiode 322 and supporting electronics 324 from most conductive and convective heat transfer from the compartment.

Although the invention is shown and described with respect to certain aspects and embodiments, it should be clear that modifications will occur to those skilled in the art upon reading and understanding the specification, and the present invention includes all such modifications.

What is claimed is:

1. A heated cabinet including door assembly comprising:
    a door positioned between opposing jambs of a door frame, wherein the door is pivotable, about a pivot axis, between an open position and a closed position;
    a motor assembly operably connected to the door to pivot the door about the pivot axis;
    a control board operatively coupled to the motor assembly;
    a first break beam emitter mounted to one of the opposing jambs; and
    a first break beam receiver mounted to another of the opposing jambs and operatively connected to the control board, wherein the first break beam emitter and the first break beam receiver are disposed along a beam axis extending parallel to the pivot axis and proximate to an edge of the door adjacent to the pivot axis, and wherein the door assembly is configured such that interruption of a beam projected between the first break beam emitter and the first break beam receiver alters operation of the motor assembly.

2. The cabinet of claim 1 wherein the assembly is configured such that interruption of the beam projected parallel to the beam axis between the first break beam emitter and the first break beam receiver alters a signal of the operative connections to the control board, which alteration of the signal in turn causes the control board to alter operation of the motor assembly.

3. The cabinet of claim 1 wherein the pivot axis is oriented horizontally.

4. The cabinet of claim 1 wherein the first break beam emitter comprises a LED and a light pipe disposed over an emitting surface of the LED, wherein the light pipe extends through the one of the opposing jambs.

5. The cabinet of claim 1 wherein the one of the opposing jambs is structurally hollow.

6. The cabinet of claim 1 wherein at least one of the opposing jambs is filled with thermal insulation material.

7. The cabinet of claim 1 wherein the first break beam receiver comprises a photodiode and a light pipe disposed over a receiving surface of the photodiode, wherein the light pipe extends through the another one of the opposing jambs.

8. The cabinet of claim 7 wherein the other one of the opposing jambs is structurally hollow.

9. The cabinet of claim 1 wherein the control board is configured, upon interruption of the beam, to stop operation of the motor assembly.

10. The cabinet of claim 1 wherein the control board is configured, upon interruption of the beam while the motor assembly is moving the door, to reverse movement of the door.

11. The cabinet of claim 1 the opposing jambs of the door frame are both oriented vertically.

12. The cabinet of claim 1 wherein the beam is configured to pass through an opening in at least one of the opposing jambs.

13. The cabinet of claim 1 wherein the beam is configured to pass through an opening in both of the opposing jambs.

14. The cabinet of claim 1 wherein one of the opposing jambs has a pair of spaced apart walls defining a space therebetween, wherein the associated one of the first break beam emitter or the first break beam receiver positioned outside the space.

15. The cabinet of claim 1 wherein the one of the opposing jambs has pair of spaced apart walls defining a space therebetween, and wherein the beam is configured to pass through an opening in both of the walls.

16. The cabinet of claim 1 further comprising a supplemental door positioned between the opposing jambs, wherein the supplemental door is positioned vertically above or vertically below the door, wherein the door and the supplemental door each provide access, while in the open position, to an associated enclosed space, wherein each enclosed space is configured to be maintained at an elevated temperature for storing foodstuffs.

17. The cabinet of claim 1 further comprising:
a second break beam emitter mounted to one of the opposing jambs; and
a second break beam receiver mounted to another one of the opposing jambs and operatively connected to the same or the other such control board, wherein the second break beam emitter and the second break beam receiver are disposed along another beam axis oriented parallel to the pivot axis and positioned on an opposite side of the door relative to the pivot axis, and wherein the assembly is configured such that interruption of another beam projected along the another beam axis between the second break beam emitter and the second break beam receiver alters operation of the motor assembly.

18. The cabinet of claim 17 wherein the assembly is configured such that upon interruption of the same beam or the another beam the associated control board stops operation of the motor assembly.

19. A method for operating a door assembly of a cabinet comprising:
accessing or providing a door assembly including a door positioned between opposing jambs of a door frame, wherein the door is pivotable, about a pivot axis, between an open position and a closed position, a motor assembly operably connected to the door to pivot the door about the pivot axis, a control board operatively coupled to the motor assembly, a first break beam emitter mounted to one of the opposing jambs, and a first break beam receiver mounted to another of the opposing jambs and operatively connected to the control board, wherein the first break beam emitter and the first break beam receiver are disposed along a beam axis extending parallel to the pivot axis and either proximate to an edge of the door adjacent to the pivot axis, or proximate to an edge of the door opposite the pivot axis; and
causing or enabling the door to pivot about the pivot axis such that interruption of a beam projected between the first break beam emitter and the first break beam receiver alters operation of the motor assembly.

20. A motorized door assembly comprising:
a door positioned between opposing jambs of a door frame and pivotable about a pivot axis between an open position and a closed position; and
a motor assembly operatively coupled to the door, the motor assembly comprising:
a motor;
a slip clutch; and
a driven shaft operably connected to the door to pivot the door about the pivot axis;
wherein the slip clutch includes a clutch plate that is slidable along the driven shaft, a drive plate driven by the motor, and a clutch biasing member urging the clutch plate into engagement with the drive plate, wherein the clutch plate has a profiled face and the drive plate has a counter-profiled face for engagement with the profiled face.

* * * * *